United States Patent
Mendoza

(10) Patent No.: US 6,467,633 B2
(45) Date of Patent: Oct. 22, 2002

(54) CABLE MANAGEMENT RACK FOR TELECOMMUNICATIONS EQUIPMENT

(75) Inventor: Jose-Filonel Tawag Mendoza, Brooklyn Center, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 09/742,983

(22) Filed: Dec. 20, 2000

(65) Prior Publication Data

US 2001/0002657 A1 Jun. 7, 2001

Related U.S. Application Data

(63) Continuation of application No. 09/507,127, filed on Feb. 18, 2000, now Pat. No. 6,223,909, which is a continuation-in-part of application No. 09/249,718, filed on Feb. 12, 1999, now Pat. No. 6,102,214.

(51) Int. Cl.⁷ .................................................. A47F 5/00
(52) U.S. Cl. ........................... 211/26; 361/826; 361/829
(58) Field of Search ................. 211/26, 189; 312/265.1, 312/265.2, 265.3, 265.4, 265.5, 265.6; 361/826, 683, 829, 825, 827

(56) References Cited

U.S. PATENT DOCUMENTS

| | | | |
|---|---|---|---|
| 2,896,009 A | 7/1959 | Caveney | |
| 4,603,377 A | 7/1986 | Kobayashi et al. | |
| 4,665,546 A | 5/1987 | Brey et al. | |
| 5,023,404 A | 6/1991 | Hudson et al. | |
| 5,220,600 A | 6/1993 | Chouanard et al. | |
| 5,326,934 A | 7/1994 | LeMaster et al. | |
| RE34,955 E | 5/1995 | Anton et al. | |
| 5,497,444 A | 3/1996 | Wheeler | |
| 5,586,012 A | 12/1996 | Lerman | |
| 5,683,001 A | 11/1997 | Masuda et al. | |
| 5,758,003 A | 5/1998 | Wheeler et al. | |
| 5,765,698 A | 6/1998 | Bullivant | |
| 5,788,087 A | 8/1998 | Orlando | |
| 5,819,956 A | 10/1998 | Rinderer | |
| 5,867,372 A | 2/1999 | Shie | |
| 5,921,402 A | 7/1999 | Magenheimer | |
| 6,102,214 A | 8/2000 | Mendoza | |
| D440,210 S | * 4/2001 | Larsen et al. | |
| 6,223,909 B1 | * 5/2001 | Mendoza | 211/26 |
| 6,318,680 B1 | * 11/2001 | Benedict et al. | 211/26 X |

FOREIGN PATENT DOCUMENTS

| | | |
|---|---|---|
| DE | 93 02 456 | 4/1993 |
| FR | 2 446 040 | 8/1980 |
| WO | WO 98/355175 | 8/1998 |

OTHER PUBLICATIONS

"Digital Distribution Frame Products", Brochure by ADC Telecommunications, Inc. of Minneapolis, Minnesota, pp. 1–15 (Mar. 1992).

(List continued on next page.)

Primary Examiner—Robert W. Gibson, Jr.
(74) Attorney, Agent, or Firm—Merchant & Gould P.C.

(57) ABSTRACT

The present disclosure relates to a rack for mounting telecommunication chassis each adapted for receiving cross-connect modules. The rack includes a frame defining a bay formed between two spaced-apart, vertical end walls. The bay is sized for receiving the telecommunication chassis. The rack also includes a cable management structure connected to the frame. The cable management structure defines first and second separate vertical channels. The first vertical channel defines a first passage area sized for receiving a plurality of cross-connect cables from the telecommunication chassis. The second vertical channel defines a second passage area sized for receiving power and ground wires from the telecommunication chassis. L-shaped tie brackets are positioned in vertical channels defined by the vertical end walls. The tie brackets assist an installer in installing and tying the input and output cables to the rack.

8 Claims, 14 Drawing Sheets

OTHER PUBLICATIONS

"Digital Signal Cross–Connect (DSX–3) Front and Rear Cross–Connect Products", Brochure by ADC Telecommunications, Inc. of Minneapolis, Minnesota, pp. 1–71 (Feb. 1999).

"DSX–1 Digital Signal Cross–Connect Modules, Panels and Accessories. Sixth Edition", Brochure by ADC Telecommunications, Inc. of Minneapolis, Minnesota, pp. 1–81 (May 1998).

"DSX–1 Digital Signal Cross–Connect Rack Framework and Accessories. Sixth Edition", Brochure by ADC Telecommunications, Inc. of Minneapolis, Minnesota, pp. 1–34 (Jul. 1998).

"Fiber Cable Management Products. Second Edition", Brochure by ADC Telecommunications, Inc. of Minneapolis, Minnesota, pp. 1–144 (Oct. 1995).

"FL2000 Products", Brochure by ADC Telecommunications, Inc. of Minneapolis, Minnesota pp. 1–48 (Nov. 1996).

"Mini DSX–3 Products", Brochure by ADC Telecommunications, Inc. of Minneapolis, Minnesota, pp. 1–35 (Jun. 1997).

"Next Generation Frame (NGF) Product Family Ordering Guide", Brochure by ADC Telecommunications, INc. of Minneapolis, Minnesota, pp. 1–21 (Oct. 1998).

* cited by examiner

CABLE MANAGEMENT RACK FOR TELECOMMUNICATIONS EQUIPMENT

RELATED APPLICATIONS

This application is a continuation of U.S. Pat. No. 6,223,909, issued May 1, 2001, which is a continuation-in-part of U.S. Pat. No. 6,102,214, issued Aug. 15, 2000, which patents are incorporated herein by reference.

FIELD OF THE INVENTION

The present invention relates generally to the field of telecommunications equipment. More particularly, the present invention relates to high density frames, bays or racks for providing cross-connections between telecommunication circuits.

BACKGROUND OF THE INVENTION

A digital cross connect system (DSX) provides a location for interconnecting two digital transmission paths. The apparatus for a DSX is located in one or more frames, racks or bays, usually in a telephone central office. The DSX apparatus also provides jack access to the transmission paths.

DSX jacks are well known and typically include a plurality of bores sized for receiving co-axial or tip-and-ring plugs. In the case of co-axial plugs, the bores are provided with center conductors and co-axial grounds. In the case of tip-and-ring plugs, a plurality of spring contacts are provided within the bores for contacting the tip-and-ring plugs. The jacks are typically electrically connected to digital transmission lines, and are also electrically connected to a plurality of wire termination members used to cross-connect the jacks. By inserting plugs within the bores of the jacks, signals transmitted through the jacks can be interrupted or monitored.

The number of jacks or cross-connect points that are located at a bay of a given size is referred to as the density of a bay. As the cross-connect density increases, the management of telecommunication wires in the bay becomes increasingly complex. For high density DSX bays, wire management is critical.

SUMMARY OF THE INVENTION

One aspect of the present invention relates to a rack for mounting telecommunication chassis each adapted for receiving cross-connect modules or jacks. The rack includes a frame defining a bay formed between two spaced-apart, vertical end walls. The bay is sized for receiving the telecommunication chassis. The rack also includes a cable management structure connected to the frame. The cable management structure defines first and second separate vertical channels. The first vertical channel defines a first passage area sized for receiving a plurality of cross-connect cables from the chassis. The second vertical channel defines a second passage area sized for receiving power and ground wires from the chassis. The second passage area is substantially smaller than the first passage area.

Another aspect of the present invention relates to a ring structure for use with telecommunications equipment. The ring structure includes a base adapted for connection to a telecommunication cross-connect rack. The ring structure also includes a first ring that projects outward from the base plate and at least partially defines a first opening sized for receiving a plurality of cross-connect cables. The ring structure further includes a second ring that projects outward from the base plate and at least partially defines a second opening sized for receiving power and ground wires. The second opening is separate from the first opening.

A further aspect of the present invention relates to a rack for mounting telecommunication chassis each adapted for receiving cross-connect modules. The rack includes a frame having a front and a back. The frame defines a bay formed between two spaced-apart, vertical end walls. The bay is sized for receiving the telecommunication chassis. The rack also includes a plurality of rings mounted at the back of the frame for receiving cross-connect cables from the cross-connect modules. The rack further includes a plurality of vertically spaced-apart plate portions projecting transversely outward from the vertical end walls adjacent the front of the frame. The plate portions are arranged and configured for connecting the frame to an adjacent frame. A plurality of slot regions are positioned between the vertically spaced-apart plate portions. The slot regions are sized for allowing front access to input/output cables positioned between adjacent frames.

An additional aspect of the present invention relates to a rack for mounting telecommunication chassis each adapted for receiving cross-connect modules. The rack is adapted to be supported on a raised floor with cut-out power cable openings for passing power cables through the floor, and cut-out input/output openings for passing input/output cables through the floor. The rack includes a frame having a top and a base. The base includes a base plate defining a power cable opening adapted to align with the cut-out power cable opening of the raised floor. The frame defines a bay formed between two spaced-apart, vertical end walls. The bay is sized for receiving the telecommunication chassis. The rack also includes outwardly facing channels that extend along the vertical end walls. The outwardly facing channels are arranged and configured for receiving input/output cables from the cross-connect modules. The outwardly facing channels are adapted to generally align with the cut-out input/output openings of the raised floor. At least one of the vertical end walls of the frame may define a cable clearance opening located at the base of the frame for allowing input/output cables extending along the at least one vertical end wall to pass directly beneath the frame. The clearance opening provides clearance for allowing the input/output cables to curve around an obstruction partially blocking the cut-out input/output opening in the floor.

A further aspect of the invention concerns L-shaped tie brackets positioned in the outwardly facing channels. A first portion of the tie bracket is used to tie the cables to the bracket, and a transverse section of the bracket is used to generate leverage during tying by wrapping the tie around the transverse portion during tightening of the tie.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
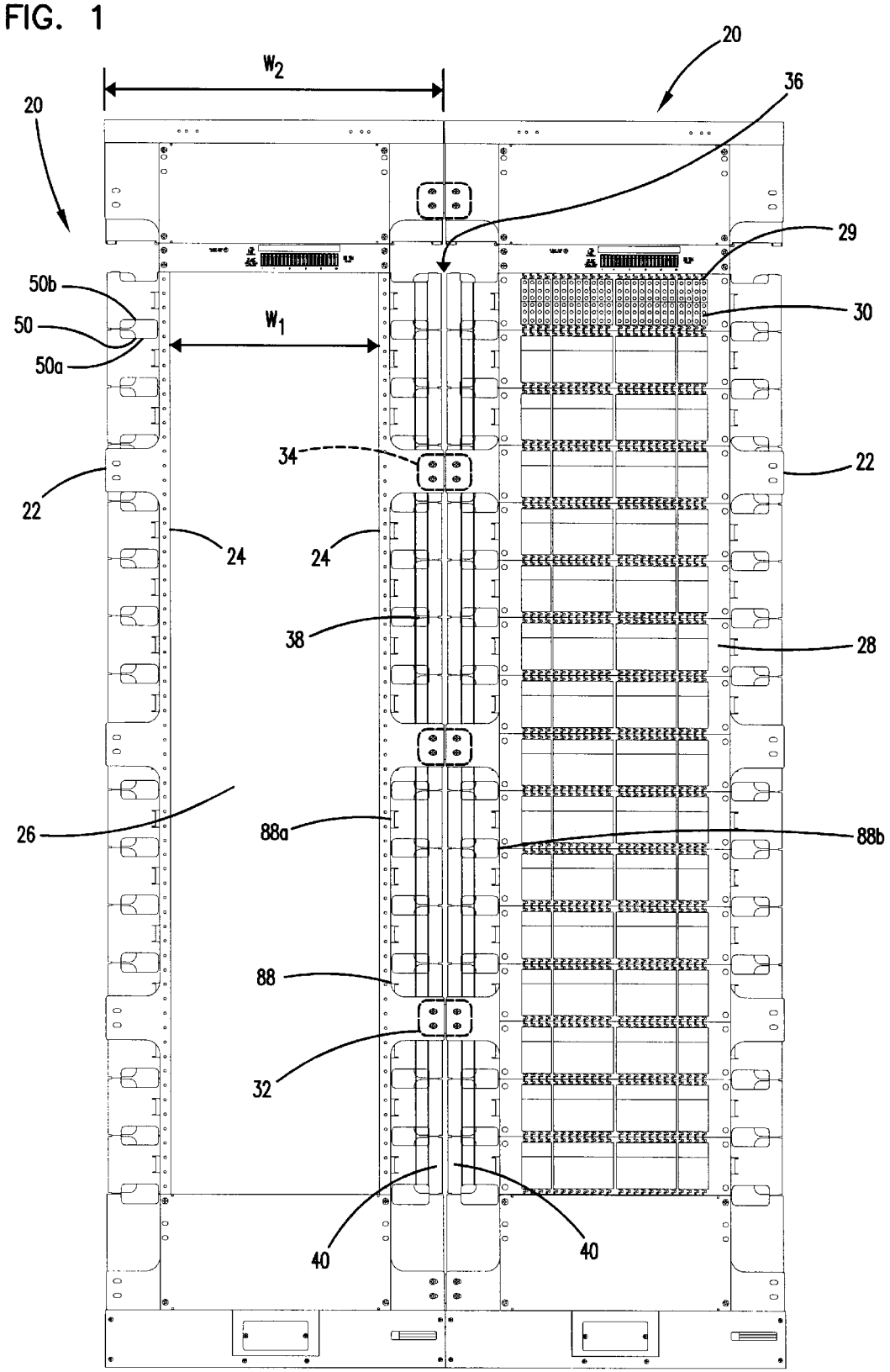
FIG. 1 is a front view of two interconnected racks constructed in accordance with the principles of the present invention.

FIG. 1 shows a front view of two racks 20 constructed in accordance with the principles of the present invention. Each rack 20 includes a frame 22 having two spaced-apart, vertical end walls 24. Each set of vertical end walls 24 defines a bay 26 sized for receiving conventional telecommunication chassis 28 (for clarity, the chassis 28 are shown in only the right-most rack 20). The chassis 28 are each adapted for holding conventional cross-connect modules 30 (only shown in one of the chassis 28) which can be permanently or removably mounted within the chassis 28. The embodiment shown in FIG. 1 is a rear cross-connect system. The modules 30 define front ports 29. By inserting patch plugs within the ports 29, signals transmitted through the modules 30 can be interrupted or monitored. At the back of the racks 20, the modules 30 provide cross-connection locations, input connection locations, output connection locations, power connection locations, and ground connection locations.

In use, input/output cables are connected to the input/output connection locations, cross-connect cables are connected to the cross-connect locations, and ground and power wires are connected to the ground and power contact locations. As will be described later in the specification, the racks 20 are configured to provide for effective cable management of the various cables and wires that interface with the modules 30 mounted on the racks 20.

Referring still to FIG. 1, the racks 20 include junction plates 32 that project transversely outward from the vertical end walls 24. The junction plates 32 are configured for interconnecting the two racks 20 together. For example, intermediate plates 34 can be bolted between the junction plates 32 to provide a mechanical connection. It is noted that the racks 20 are placed directly adjacent to one another with no fillers being positioned between the racks 20.

A vertical channel 36 is preferably positioned between the two racks 20. The vertical channel 36 would typically be used to provide vertical management of input and output cables 38 connected to the cross-connect modules 30. Front access openings 88 are provided to facilitate accessing the input/output cables 38 within the channel 36. To maximize the size of the vertical channel 36, each bay 26 preferably has a width $W_1$ that is relatively small as compared to a total width $W_2$ of each rack 20. For example, in certain embodiments, the width $W_1$ of each bay 26 is about 368 mm, and the width $W_2$ of each rack 20 is about 600 mm. It is preferred for the width $W_1$ of each bay 26 to be less than 400 mm.

Figure 2:
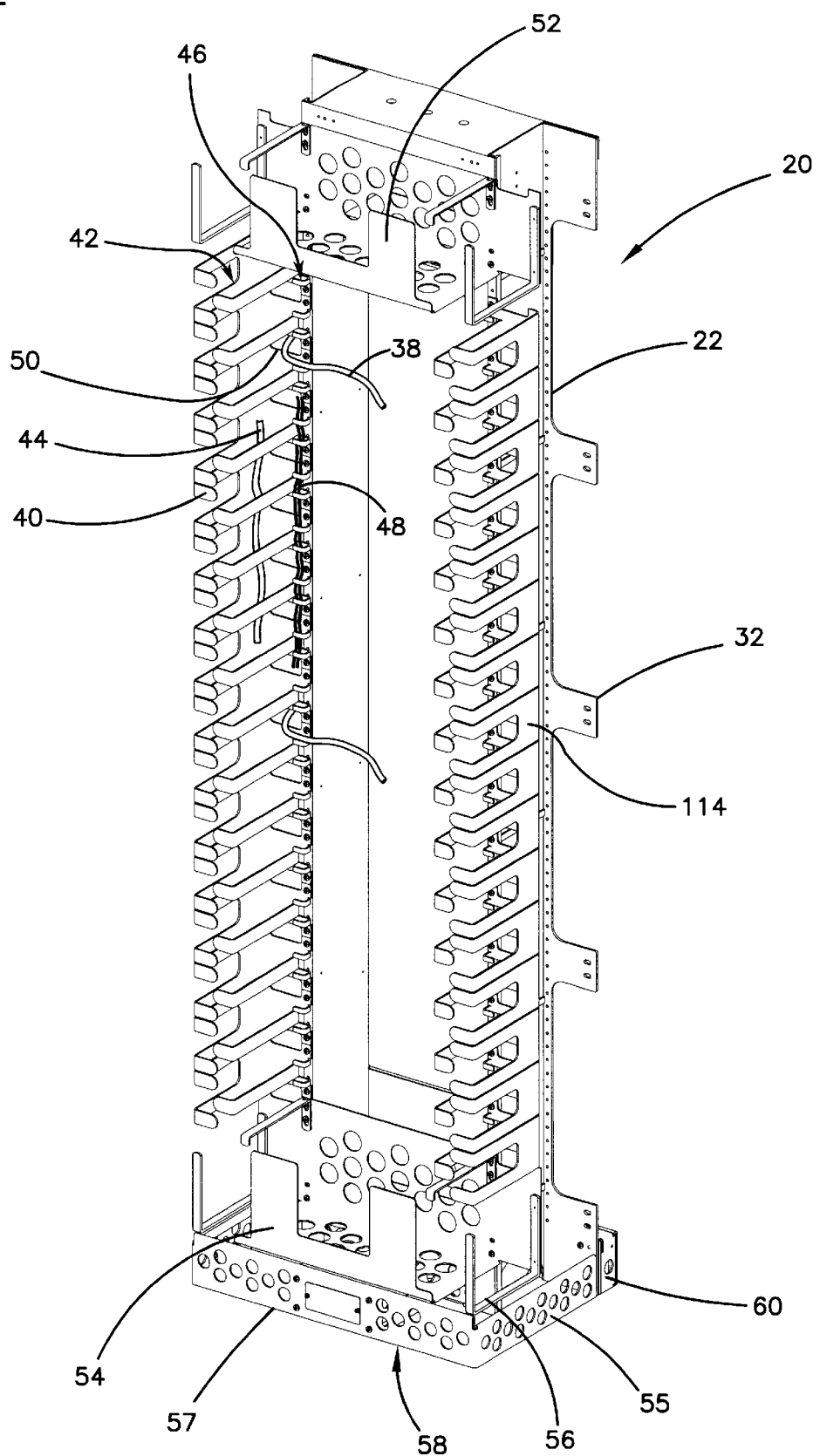
FIG. 2 is a rear perspective view of one of the racks of FIG. 1.

FIG. 2 is a rear perspective view of one of the racks 20. For clarity and ease of description, the chassis 28 and cross-connect modules 30 have been removed from FIG. 2.

The rack 20 includes two columns of ring structures 40. Each column of ring structures 40 defines a first vertical channel 42 sized for receiving cross-connect cables 44 from the cross-connect modules, and a second vertical channel 46 sized for receiving power and ground wires 48 (e.g., 45 volt). By separating the cross-connect cables 44 from the power and ground wires 48, concerns about cross-talk between the wires and cables can be reduced.

Openings 50 are defined between adjacent ring structures 40 in each column. The openings 50 are configured for allowing the input/output cables 38 to be fed from the vertical channels 36 (shown in FIG. 1) to the backside of the rack 20 where electrical connections can be made with the input and output contact locations of the modules 30. It will be appreciated that the input/output cables 38, the cross-connect cables 44 and the power and ground wires 48 have been shown schematically.

Referring still to FIG. 2, the rack 20 includes upper and lower troughs 52 and 54 for supporting cross-connect cables that are fed across the back of the rack 20. The cross-connect cables are fed between racks to provide cross-connections between modules of different racks. Support brackets 56 are used to support cross-connect wires that extend between two adjacent racks. The channels 42 defined by the ring structures 40 provided for vertical cable management of the cross-connect cables.

A cable guard assembly 58 is positioned below the lower trough 54 at the base of the rack 20 (e.g., at floor level). The cable guard assembly 58 includes a guard box 60 positioned at the front of the rack 20, end guard members 54 that cover the ends of rack 20, and a rear guard member 56 that covers the back of the rack 20. Holes are provided in various components of the guard assembly 58 to reduce weight and cost.

Figure 3:
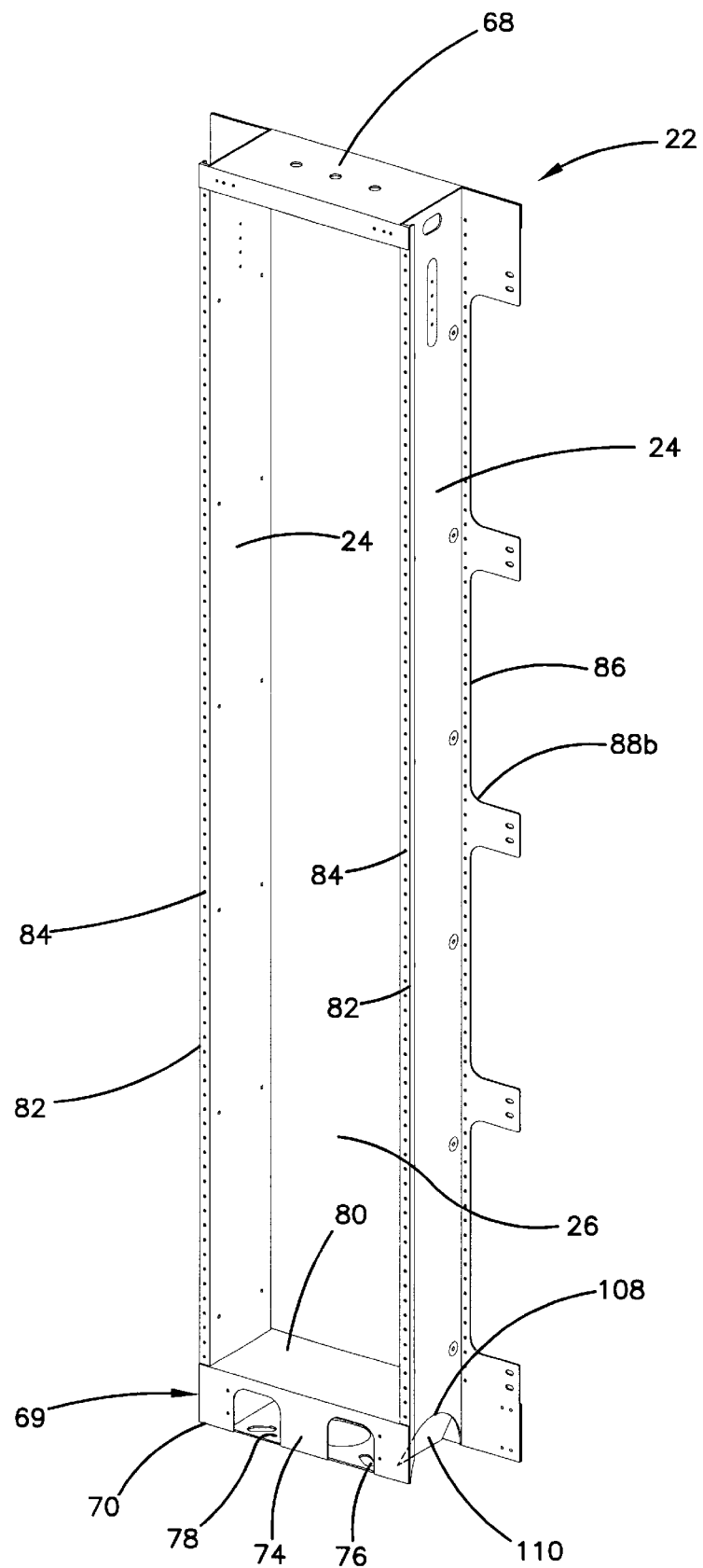
FIG. 3 is a rear perspective view of a frame used by the rack of FIG. 2.
Figure 4:
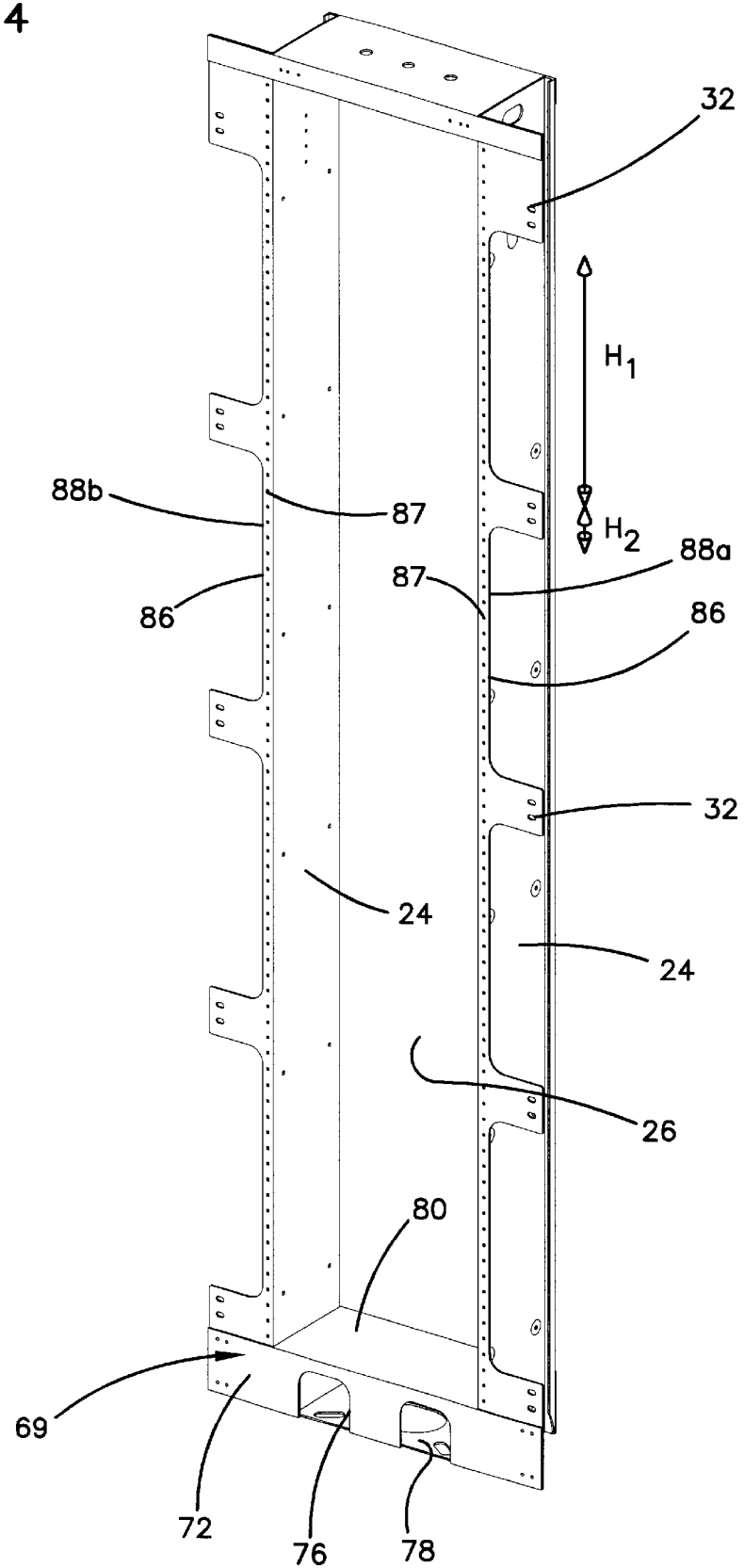
FIG. 4 is a front perspective view of the frame of FIG. 3.

Referring to FIGS. 3 and 4, the frame 22 of the racks 20 is shown in isolation. The frame 22 includes a top end 68 positioned opposite from a base end 70. A base box 69 is formed adjacent the base end 70. The base box 69 includes opposing front and back walls 72 and 74. The front and back walls 72 and 74 define openings 76 for accessing the interior of the base box 69. The base box 69 also includes a base plate 78 adapted to be positioned at floor level, and a horizontal wall 80 positioned above the base plate 78. The horizontal wall 80 defines the bottom of the bay 26.

Referring to FIG. 3, the frame 22 includes rear lips 82 that project transversely outward from the vertical end walls 24 adjacent the backside of the frame 22. The rear lips 82 define a plurality of openings 84 for use in bolting or otherwise connecting the ring structures 40 to the backside of the frame 22. Similar front lips 86 project transversely outward from the vertical end walls 24 adjacent the front of the frame 22. The front lips 86 define openings 87 for allowing the chassis 28 to be bolted or otherwise connected to the frame 22.

The junction plates 32 of the rack 20 are integral with the front lips 86. Slots or cut-out portions 88a and 88b are formed between the junction plates 32. The cut-out portions 88a and 88b are configured for allowing front access to the input/output cables 38 positioned within the vertical channel 36 formed between the racks 20. For example, as shown in FIG. 1, the cut-out portions 88a and 88b cooperate to define the front access openings 88. It is preferred for the cut-out portions 88 to each have a height $H_1$ that is longer than a corresponding height $H_2$ of the junction plates 32. In certain embodiments, the heights $H_1$ of the cut-out portions 88 are at least two or three times as large as the heights $H_2$ of the junction plates 32.

Figure 5:
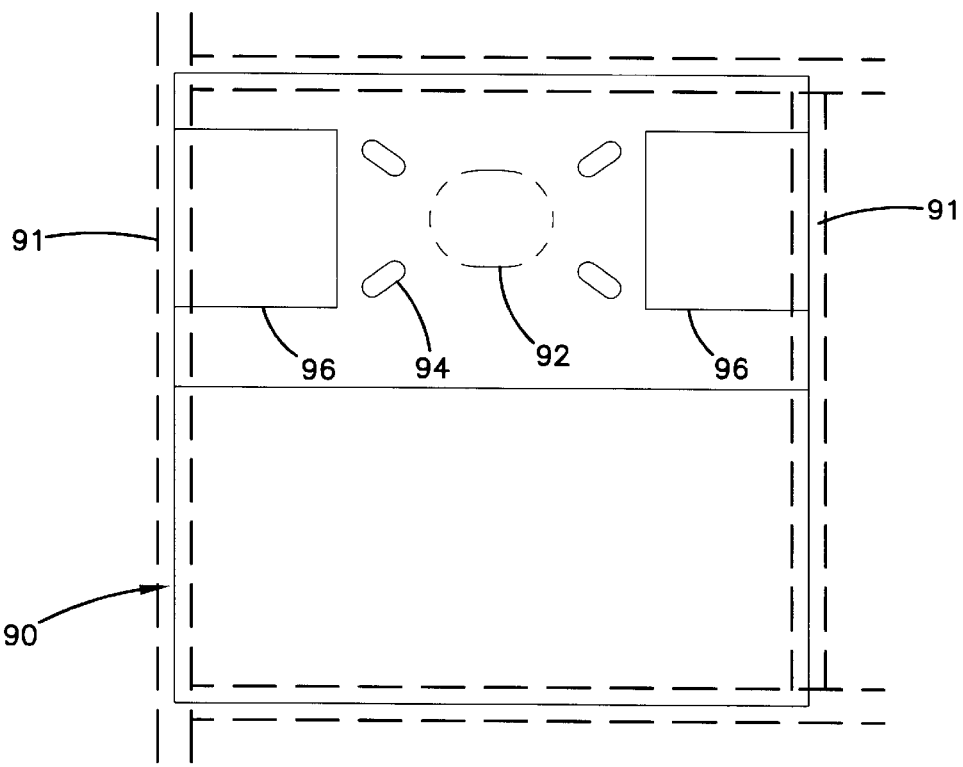
FIG. 5 is a cut-out detail for a raised floor adapted for supporting the rack of FIG. 2.

FIG. 5 shows one of a plurality of floor tile 90 suitable for supporting the rack 20. The floor tile 90 is preferably raised above a main floor such that cables (e.g., A/C power cables and input/output cables) can be passed beneath the raised floor 90. In one particular embodiment, the floor tile 90 is 600 mm×600 mm and is supported by a support grid 91. A hole pattern is cut into one half of the tile 90. The hole pattern includes a central opening 92 through which an A/C power cable can be passed. The pattern also includes four slots 94 for use in bolting one of the racks 20 to the raised floor 90. The pattern further includes two rectangular cutouts 96 for passing input and output cables 38 through the raised floor 90 and into the vertical channels 36 defined between the racks 20. The cutouts are partially obstructed by the support grid 91.

Figure 6:
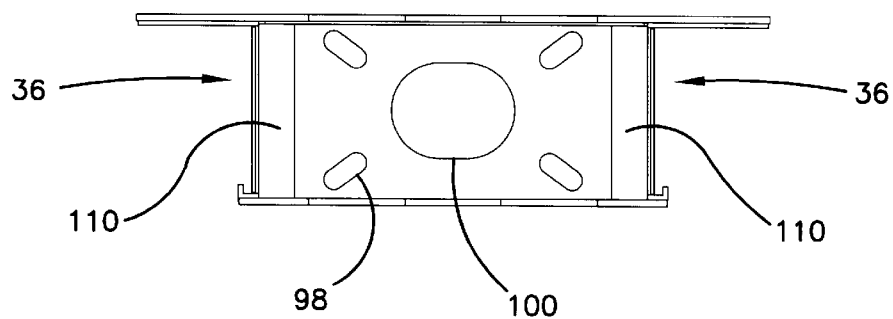
FIG. 6 is a floor mounting detail for the rack of FIG. 2.

FIG. 6 is a plan view of the base plate 78 of the frame 22. The base plate 78 defines four slots 98 adapted to align with the slots 94 cut through the raised floor 90. The base plate 78 also includes a central opening 100 adapted to align with the central opening 92 of the raised floor 90. The outwardly facing channels 36 of the frame 22 are adapted to align with the rectangular cutouts 96 in the raised floor 90. To connect the racks 20 to the floor, bolts are secured through the slots 94 and 98. To provide A/C power adjacent the rack 20, an A/C power cable can be fed through the central openings 92 and 100. Preferably, the A/C power cable is electrically connected to an outlet that can be mounted in one of the openings 76 defined by the front and back walls 72 and 74 of the frame box structure.

Figure 7:
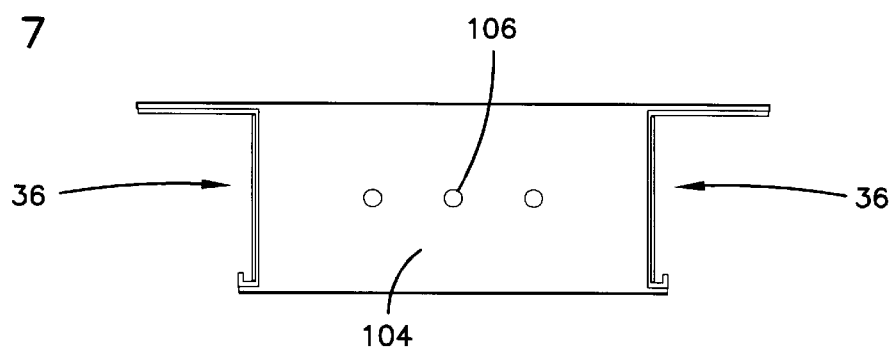
FIG. 7 is a top mounting detail for the rack of FIG. 2.

FIG. 7 shows a mounting detail for the top end 68 of the rack 20. The top end 68 includes a horizontal top plate 104 that defines the top of the bay 26. Three holes 106 are formed through the top plate 104. The holes 106 can be used to secure the top end 68 of the rack 20 to a ceiling or other structure through the use of attachment rods.

Referring back to FIG. 3, the right-most vertical end wall 24 defines a clearance opening 108 located at the base of the frame 22. The clearance opening 108 is configured for allowing input/output cables 38 (shown in FIG. 1) that extend along the right-most vertical wall 24 to pass directly beneath the bay 26 of the frame 22. In this manner, the clearance opening 108 provides clearance for allowing the input/output cables 38 to curve around or otherwise bypass an obstruction (e.g., the support grid 91 of FIG. 5) that may partially block the rectangular cut-out 96 in the raised floor 90. Absent the clearance opening 108, the support grid 91 would reduce the capacity of the vertical channels 36.

An inclined plate 110 is positioned adjacent to the clearance opening 108. The inclined plate 110 extends from the base plate 78 to a location above the clearance opening 108. At least a portion of the inclined plate 110 is located directly beneath the bay 26. The inclined plate 110 functions to protect the cables passing through the clearance opening 108.

Figure 8:
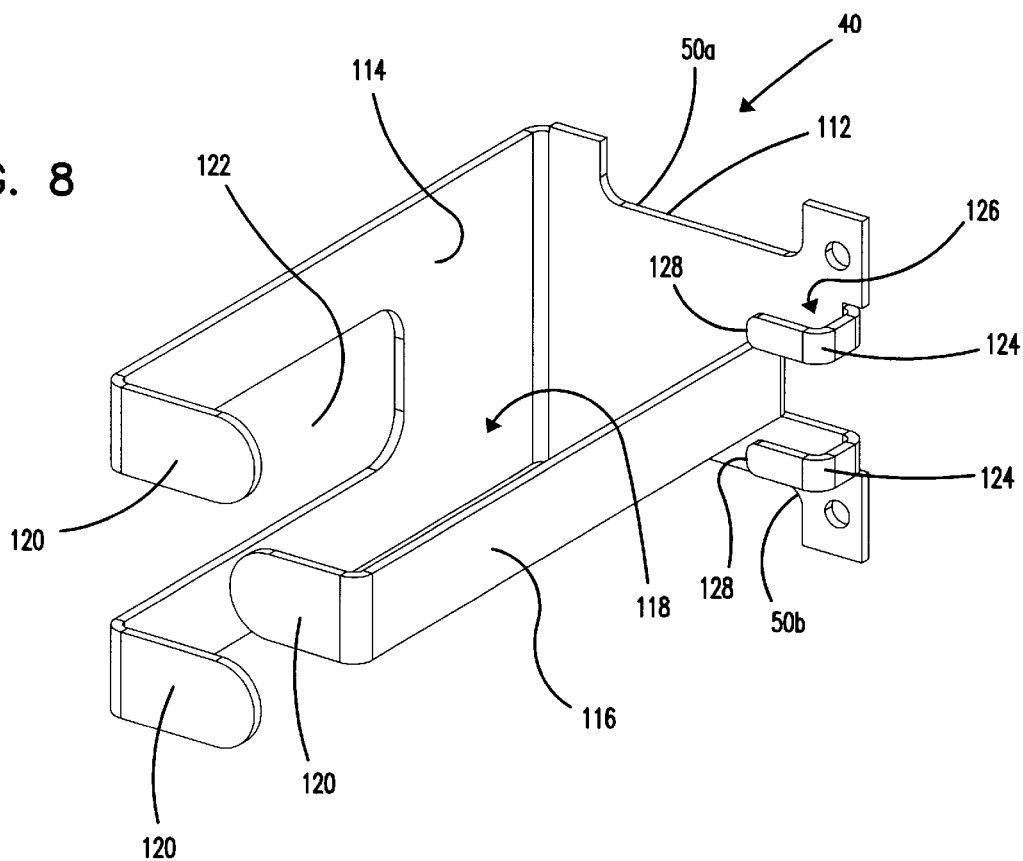
FIG. 8 is a perspective view of one of a plurality of ring structures mounted at the back of the rack of FIG. 2.
Figure 9:
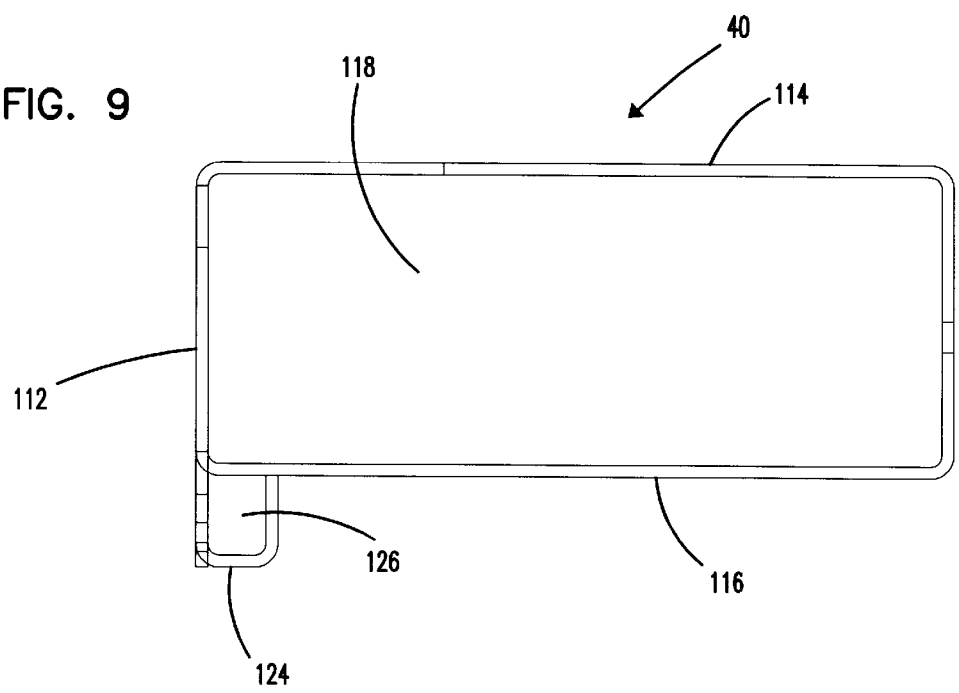
FIG. 9 is a top plan view of the ring structure of FIG. 8.

FIGS. 8 and 9 show one of the ring structures 40 in isolation from the rack 20. The ring structure 40 includes a base 112 adapted for connection to the rack 20 (e.g., bolt holes are provided through the base 112 for allowing the ring structure 40 to be bolted to the frame 22). The ring structure 40 also includes first and second opposing members 114 and 116 that project transversely outward from the base plate 112 and at least partially define a first opening 118 sized for receiving a plurality of cross-connect cables. The first and second opposing members 116 and 118 have bent ends 120 that extend toward one another and are generally parallel with respect to the base 112. A cut-away portion 122 is formed through the first opposing member 114 for allowing cross-connect cables to be fed into the first opening 118. The second opposing member 116 is in general alignment with the cut away portion 122.

The ring structure 40 also includes first and second vertically spaced-apart L-shaped members 124 that at least partially define a second opening 126 sized for receiving power and ground wires. The L-shaped members have free ends 128 that terminate adjacent the second opposing member 116. When a plurality of the ring structures 40 are mounted in a column along the frame 22, the first openings 118 are aligned along a first vertical axis to form the first vertical channel 36, and the second openings 126 are aligned along a second vertical axis to form the second vertical channel 46. As mounted on the frame 22, the outer surfaces of the first opposing members 114 align generally with the outermost edges of the junction plates 34. Consequently, when two racks 20 are interconnected as shown in FIG. 1, ring structures 40 corresponding to one of the racks 20 are placed in close proximity to ring structures 40 corresponding to the other of the racks 20 such that the ring structures 40 enclose the back of the channel 36 defined between the racks 20.

Referring to FIG. 8, the base 112 of the ring structure 40 defines upper and lower notches 50a and 50b. When mounted on the rack 20, as shown in FIG. 1, the upper and lower notches 50a and 50b of the ring structures 40 cooperate to define the access openings 50.

Referring to FIG. 9, the first opening 118 preferably has a cable passage area that is substantially larger than the cable passage area of the second opening 126. For example, as shown in FIG. 9, the first opening 118 has a cable passage area that is over 25 times as large as the cable passage area of the second opening 126.

Figure 10:
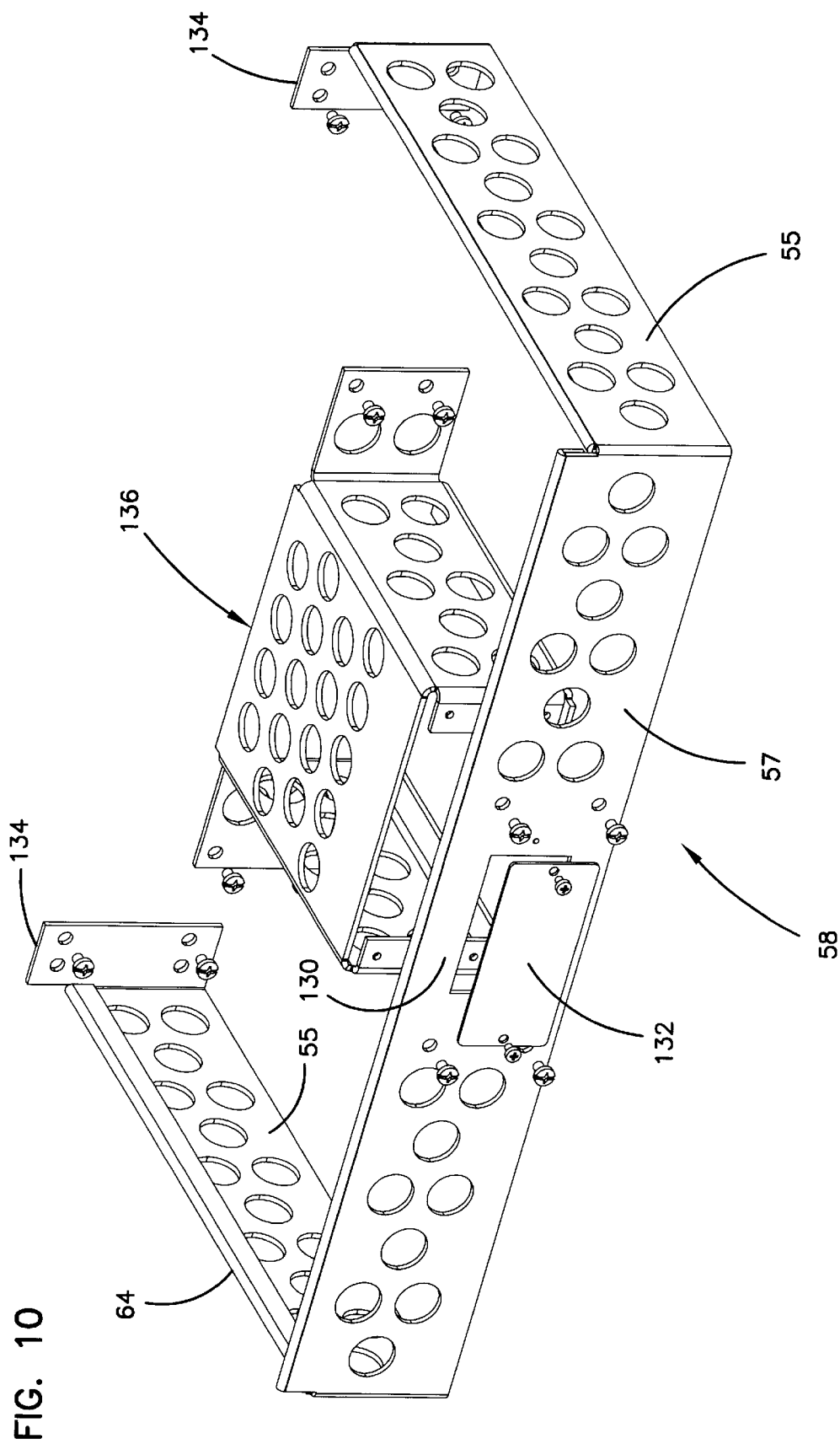
FIG. 10 is an exploded perspective view of a cable guard assembly adapted to be mounted at the base of the rack of FIG. 2.

FIG. 10 shows the rear and end guard members 57 and 55 (which are made as a single piece component) of the cable guard assembly 58 in isolation from the rack 20. As shown in FIG. 10, the rear guard member 57 defines an access opening 130 for allowing access to an A/C power outlet secured to the frame 22. When the access opening 130 is not in use, a removable cover plate 132 bolted to the rear guard 62 is used to close the opening 130.

The rear guard member 57 and the side guard members 55 are preferably connected to the frame 22 by conventional techniques such as bolts. For example, as shown in FIG. 10, the side guard members 55 include flanges 134 adapted to be bolted to the lower-most junction plates 32 of the frame 22.

Referring still to FIG. 10, the cable guard assembly 58 also includes an inner cable guard 136 that is preferably bolted to the back wall 72 of the base box 69. In certain embodiments, the inner cable guard 136 can be welded or otherwise fixedly connected to the frame 20 to provide additional structural support. The inner cable guard 136 forms a housing that encloses the openings 76 defined by the back wall 74 and functions to cover A/C outlets that can be mounted in the openings 76 or mounted elsewhere within the inner cable guard 136 (e.g., at the opening 130).

Figure 11:
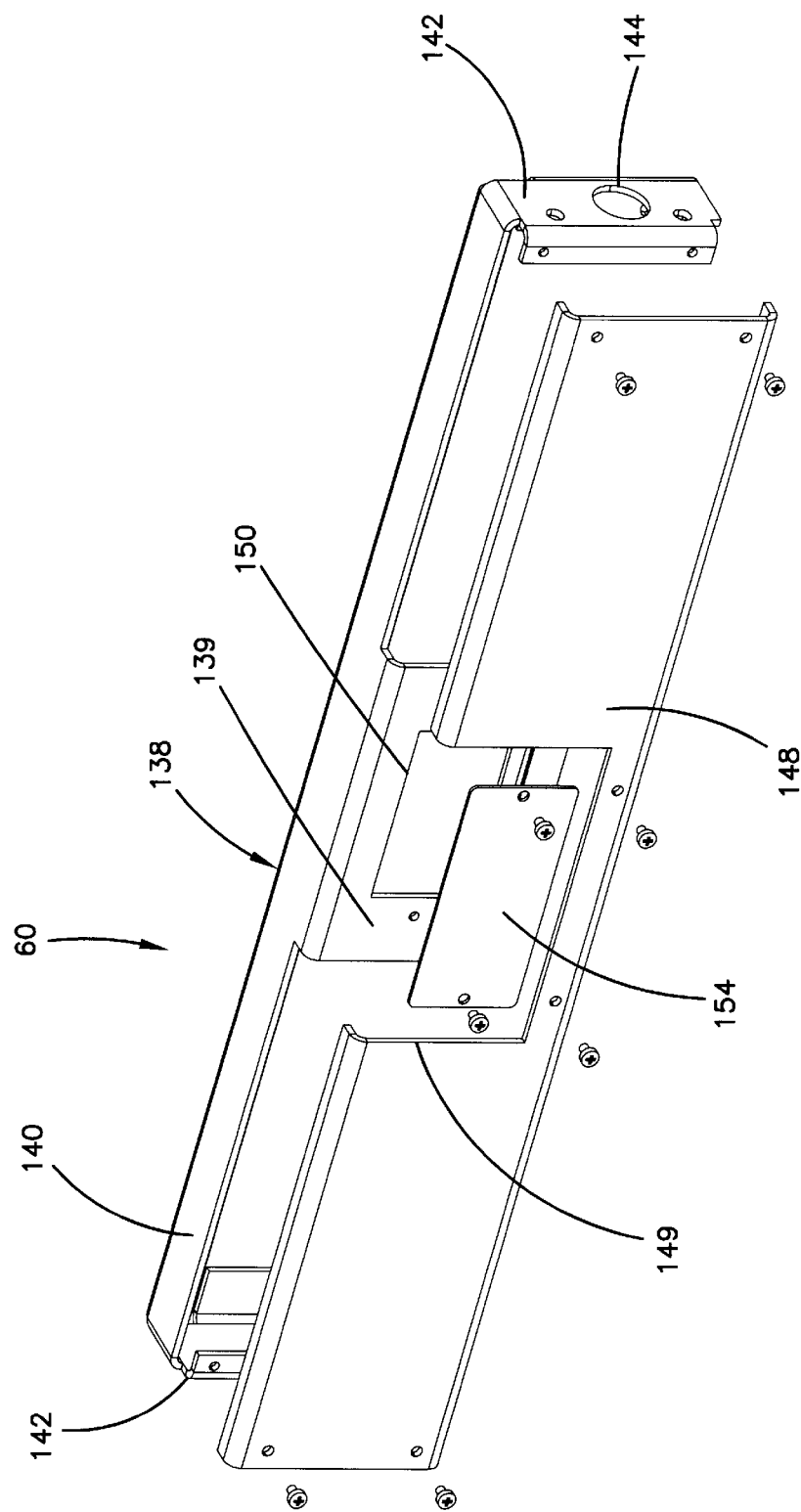
FIG. 11 is an exploded perspective view of a guard box adapted to be mounted at the front of the rack of FIG. 2.

FIG. 11 shows the guard box 60 in isolation from the frame 22. The guard box 60 includes a main housing 138 that is preferably bolted to the front wall 72 of the box structure 69. The main housing 138 includes a top wall 140 and two spaced-apart end walls 142. In certain embodiments, the top wall 140 can be welded or otherwise fixedly connected to the frame 20 to provide additional frame support. The end walls 142 define cable openings 144 for allowing an A/C power cable to be fed between adjacent racks 20. A back side of the main housing 138 is substantially open. A front side of the main housing 138 includes a central face plate 139 that extends downward from the top wall 140. The remainder of the front side of the main housing 138 is covered by a removable main face plate 148. The main face plate 148 includes a cut-out portion 149 for receiving the central face plate 139. The central face plate 139 defines a central opening 150 for providing access to an A/C outlet mounted within the box 60 (e.g., adjacent the central opening 150). A rectangular cover plate 154 is used to cover the access opening 150. The outlet cover 154 and the main cover 148 are preferably bolted to the main housing 138 so as to be removable. In this manner, the main face plate 148 can be removed without removing the outlet cover 154.

Figure 12:
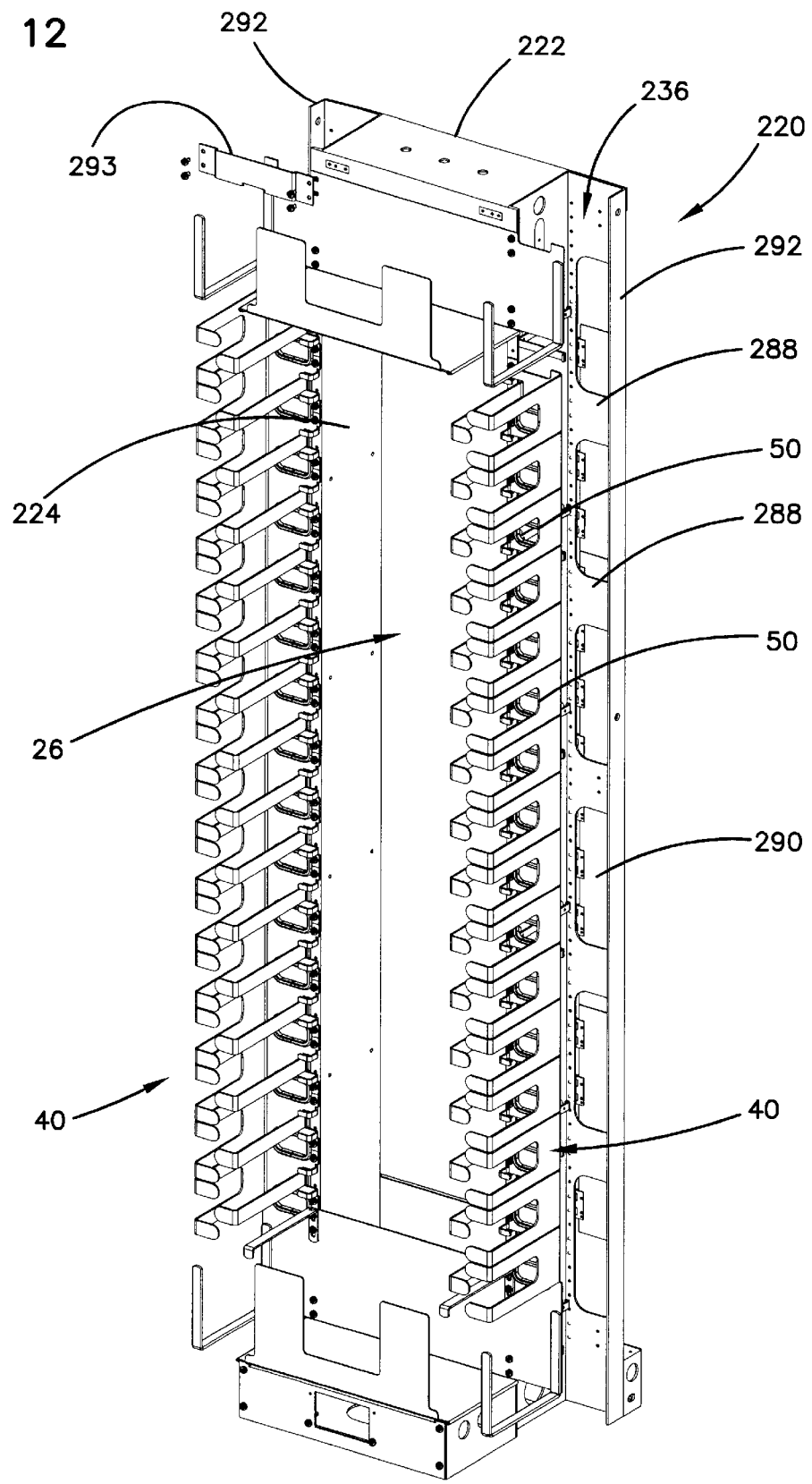
FIG. 12 is a rear perspective of a modified rack.
Figure 13:
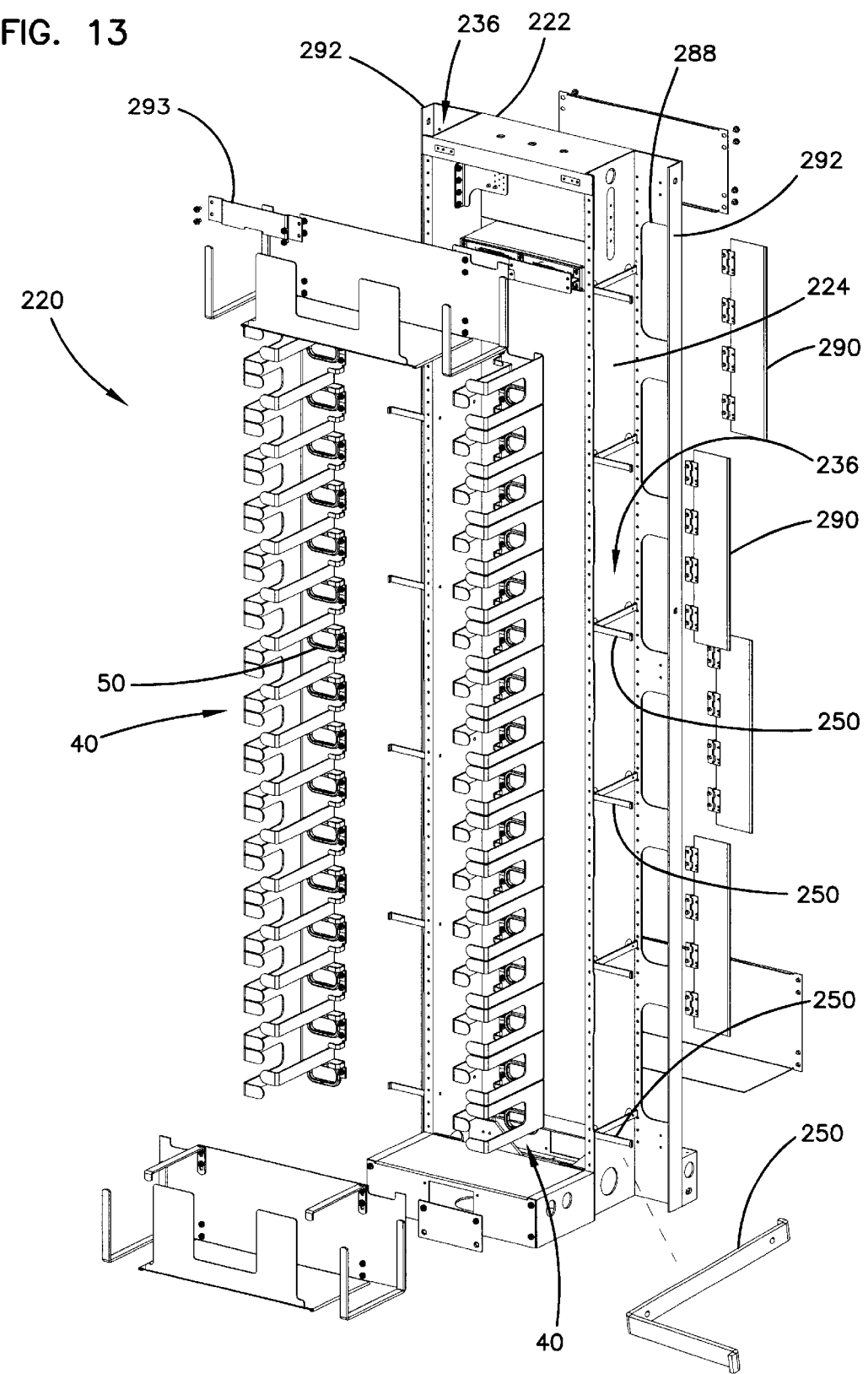
FIG. 13 is an exploded rear perspective of the rack of FIG. 12.

FIGS. 12 and 13 show a modified rack 220 constructed in accordance with the principles of the present invention. Several aspects of rack 220 are similar to rack 20 noted above. Rack 220 includes a frame 222 having two spaced-apart, vertical end walls 224 for defining a bay 26 for receiving conventional telecommunication chassis 28. Frame 222 defines access slots or openings 288 so as to provide access to the input/output cables 38 within channels 236. Closed openings 288 are provided instead of open sided slots as provided for rack 20. Movable doors 290 selectively close access openings 288, as desired. Further, doors 290 provide a surface for indicia for identifying cables and/or connectors.

By closing access openings 288, a longitudinal end flange 292 is provided for use in mounting rack 220 to another rack 220 in side-by-side manner thereby providing further structural support for the system. By mounting two racks 220 side by side with end flanges 292 in abutting relationship, vertical channels 236 are only accessible to an installer or service person through one of the access openings 288 adjacent a front of rack 220. Rear brackets 293 also link adjacent racks 220.

Figure 14:
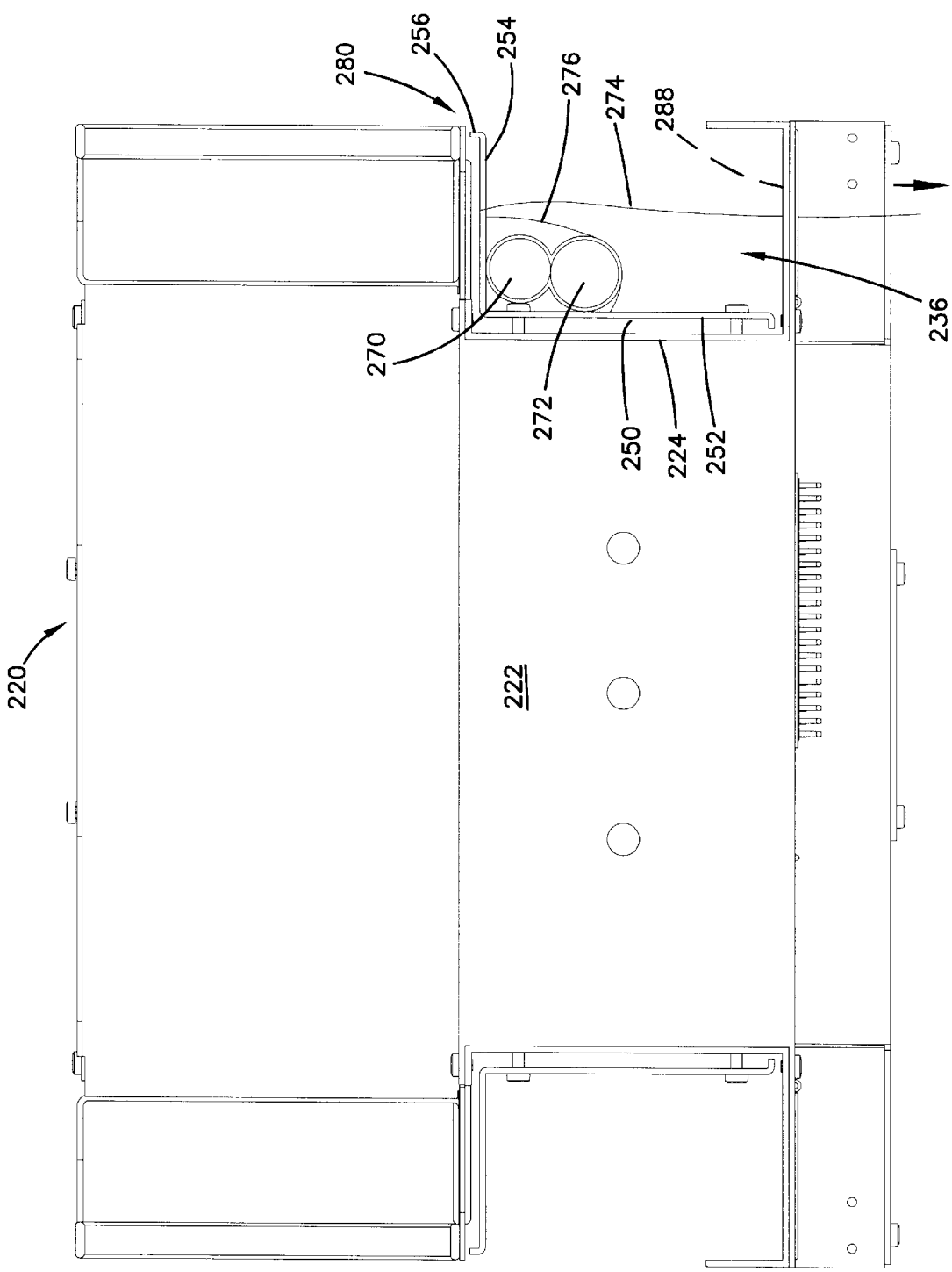
FIG. 14 is a top view of the rack of FIG. 12.

Rack 220 further includes L-shaped tie brackets 250 for use in tying the input/output cables in channel 236. Referring now to FIG. 14, tie bracket 250 includes a first longitudinal section 252 mounted parallel to end wall 224 in a slightly spaced manner. Bracket 250 further includes a transverse section 254 positioned in vertical channel 236 opposite to access openings 288. Transverse section 254 includes a free end 256 disposed away from end wall 224. During use, input and output cables are positioned in channel 236. In FIG. 14, exemplary cables 270, 272 are shown. Typically, many more cables are ultimately positioned in vertical channel 236. However, any number of cables can be positioned therein, as desired. During installation, it is important that cables 270, 272 be tied or otherwise secured in place within vertical channel 236. A tie 274, such as string or twine may be used to tie each cable to longitudinal section 252 of bracket 250. Since vertical channel 236 is only accessible from a front of rack 220 through opening 288, a difficulty may arise in applying sufficient leverage for tying cables 270, 272 tightly within channel 236 to longitudinal section 252. Bracket 250 is advantageously used during the tying operation. A free end 276 of string 274 is wrapped around transverse section 254 and pulled through access opening 288 by the installer. Transverse section 254 thereby provides a leverage action for more securely tying cables 270, 272 to longitudinal section 252 of bracket 250. The installer positions free end 276 of string 274 behind transverse section 254 by passing the string through the small gap 280 adjacent to free end 256 of transverse section 254. Once each successive cable or group of cables is tied, the string 274 is removed from behind transverse section, thereby allowing further cables to be tied. The installer repeats the operation until the desired number of cables have been tied. Transverse section 254 can also be used to hold the free end of the string while the installer positions further cables ready for tying. Transverse section 254 can also be used to tie the loose cables (the service loops) exposed from within the jacket of cables 270, 272. before passing through openings 50 of ring structures 40.

Figure 15:
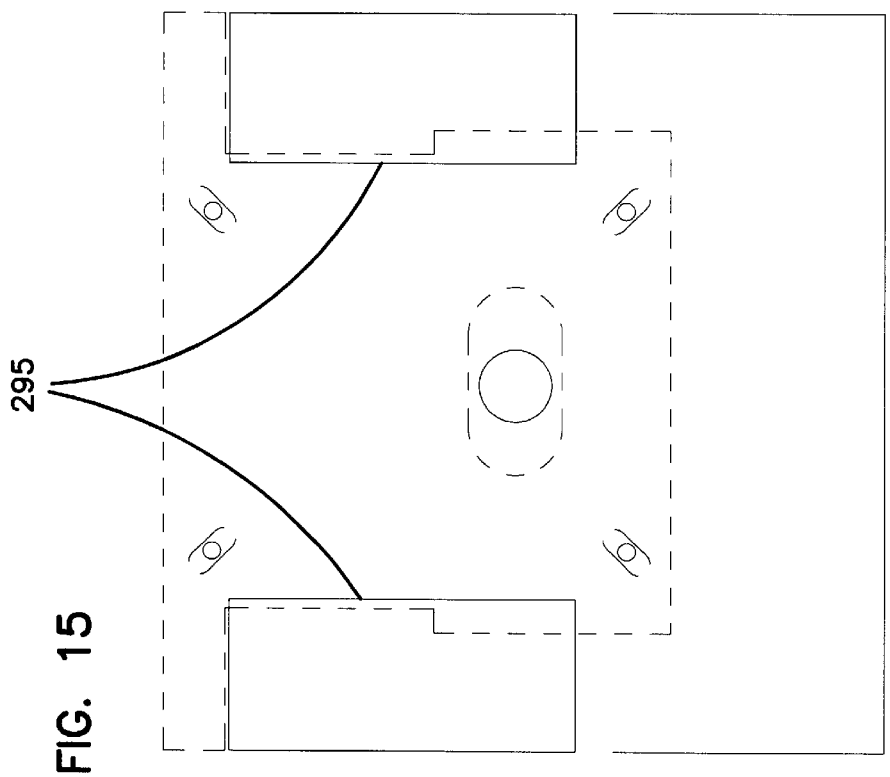
FIG. 15 is a cut-out detail for a raised floor adapted for supporting the rack of FIG. 12.

Referring now to FIG. 15, as well as FIGS. 12–14, 17, and 18, rack 220 includes a more straight or vertical pass through for the input/output cables entering vertical channels 236 through a floor entry and exit location. FIG. 15 illustrates the floor cable cutouts 295 usable with rack 220.

Figure 17:
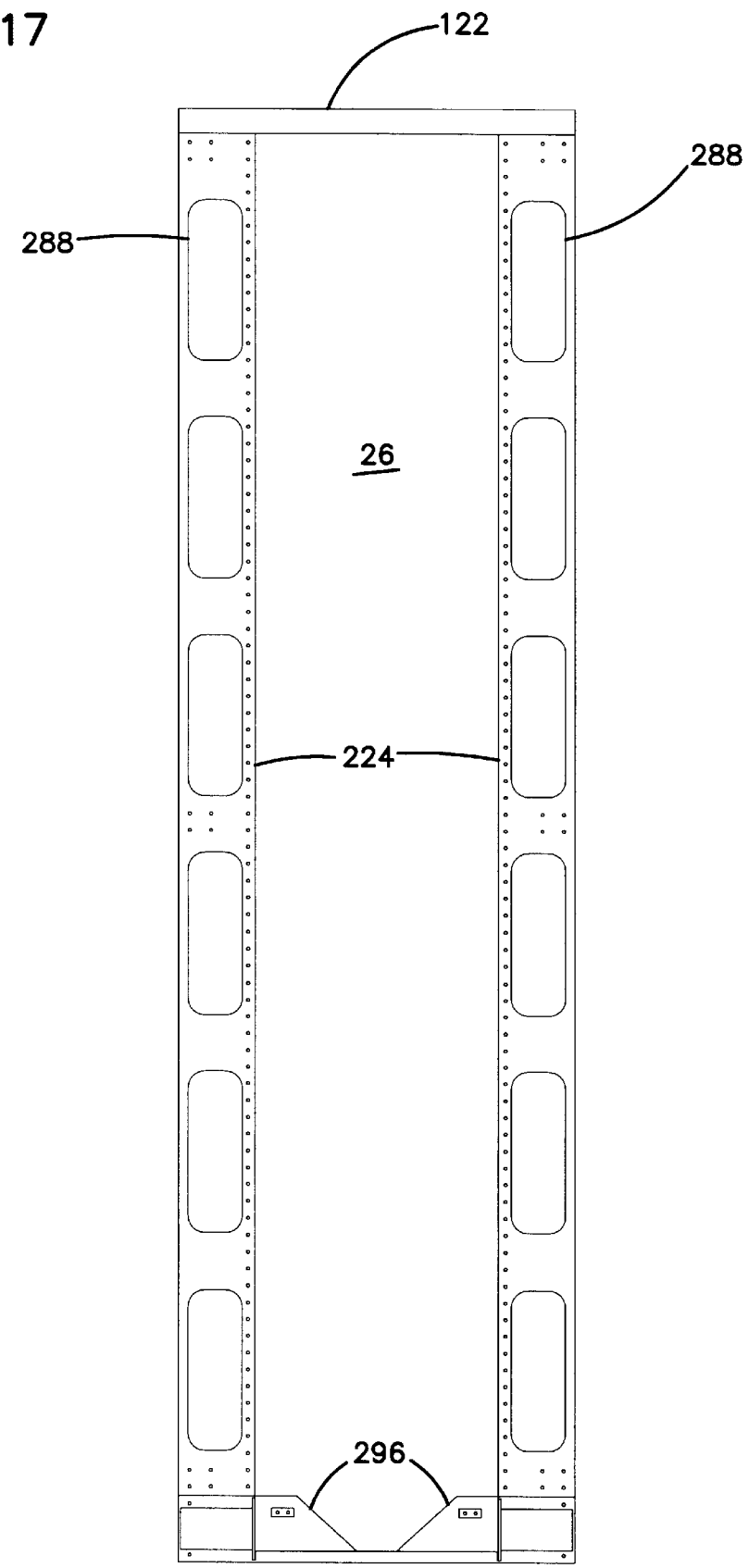
FIG. 17 is a front view of the frame of the rack of FIG. 12.
Figure 18:
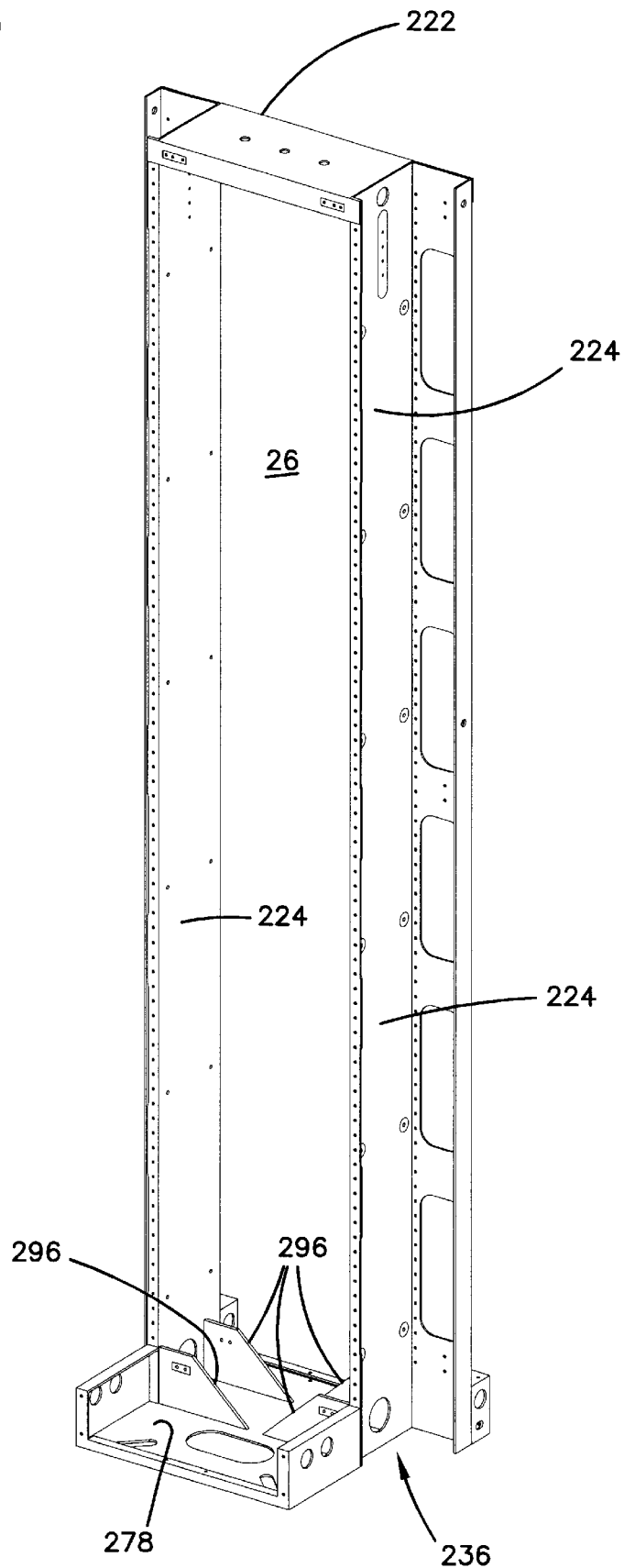
FIG. 18 is a rear perspective view of the frame of FIG. 17.

With further reference to FIGS. 17 and 18, frame 220 includes grounding gussets or plates 296 for use in grounding power cables to frame 222 during use. Grounding plates 296 further provide structural support by linking end walls 224 to base plate 278.

Figure 16:
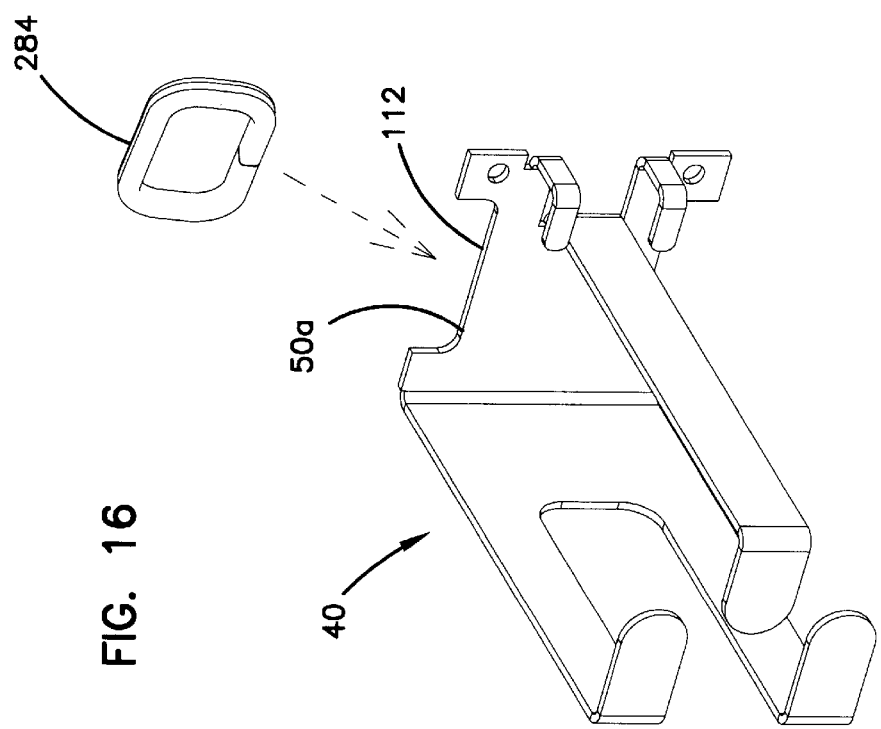
FIG. 16 is a perspective view of one of a plurality of ring structures mounted at the back of the rack of FIG. 12 with a cable guard shown in exploded view.

Referring now to FIG. 16, ring structure 40 is shown in combination with a cable grommet 284 or guard for protecting the cable from damage due to the edge provided by notches 50a of each of the ring structures 40, such as when ring structure 40 is made from metal.

With regard to the foregoing description, it is to be understood that changes may be made in detail, especially in matters of the shape, size and arrangement of the parts without departing from the scope of the present invention. It is intended that the specification and depicted aspects be considered exemplary only, with a true scope and spirit of the invention being indicated by the broad meaning of the following claims.

I claim:

1. A rack for mounting telecommunications chassis each adapted for receiving cross-connect modules, the rack comprising:
   a frame including a front and a back;
   the frame defining a bay formed between two spaced-apart, vertical end walls, the bay being sized for receiving the telecommunication chassis;
   a plurality of rings mounted at the back of the frame for receiving cross-connect cables from the cross-connect modules;

the frame defining two front vertical cable channels, each front vertical cable channel defined in part by one of the vertical end walls, each front vertical cable channel further defined by a front wall portion of the frame, each front vertical cable channel further defined by a forward end of the rings;

the front wall portion of the frame defining a plurality of vertically spaced-apart access openings to access the front vertical cable channels from the front of the frame and including a flange formed at the outer edge of each front wall portion, the flange extending from adjacent to a top to a bottom of the front wall portion;

the forward end of the rings opposing the front wall portion of the frame such that a vertical channel for receiving input/output cables is formed between the rings and the front wall portion; and the forward end of the rings defining access openings for allowing the input/output cables to be fed from the front vertical cable channel to the back of the frame.

2. The rack of claim 1, wherein the rack is configured to receive a stabilizing bracket at the rear corner of the frame for connection with an adjacent second frame, the second rack being similarly constructed and arranged.

3. The rack of claim 1, wherein the access openings of the front wall portion providing access into the vertical cable channel include hinged doors covering the openings.

4. The rack of claim 1, wherein the flanges extend rearward from the front wall portions and further define the front vertical cable channels.

5. A rack system for mounting telecommunication chassis each adapted for receiving cross-connect modules, the rack system comprising:

first and second racks each including:
  a frame including a front and a back;
  the frame defining a bay formed between two spaced-apart, vertical end walls, the bay being sized for receiving the telecommunication chassis;
  a plurality of rings mounted at the back of the frame for receiving cross-connect cables from the cross-connect modules;
  the frame defining two front vertical cable channels, each front vertical cable channel defined in part by one of the vertical end walls, each front vertical cable channel further defined by a front wall portion of the frame, each front vertical cable channel further defined by a forward end of the rings;

the front wall portion of the frame defining a plurality of vertically spaced-apart access openings to access the front vertical cable channels from the front of the frame and including a flange formed at the outer edge of each front wall portion; and the forward end of the rings opposing the front wall portion of the frame such that a vertical channel for receiving input/output cables is formed between the rings and the front wall portion; and the forward portion of the rings defining access openings for allowing the input/output cables to be fed from the vertical cable channel to the back of the frame;

the first and second racks being interconnected such that one of the front wall flanges of the first rack is directly adjacent to one of the front wall flanges of the second rack and the first and second rack being securely attached to one another by a plurality of fasteners extending between front wall flanges of the first and second racks;

the first and second racks defining a vertical channel thereinbetween for receiving the input/output cables;

the rings of the first and second racks being arranged and configured to enclose a back of the vertical channel; and the vertical channel having a front enclosed by the adjacent front wall portions of the first and second racks, wherein the access openings of the first and second racks are configured to provide front access to the input/output cables within the vertical channel.

6. The rack system of claim 5, wherein the first rack is configured to receive a stabilizing bracket at the rear corner of the frame for connection with the frame of the adjacent second rack.

7. The rack system of claim 5, wherein the access openings of the front wall portions providing access into the vertical cable channels include hinged doors covering the openings.

8. The rack system of claim 5, wherein the flanges extend rearward from the front wall portions and further define the front vertical cable channels.

* * * * *

UNITED STATES PATENT AND TRADEMARK OFFICE
CERTIFICATE OF CORRECTION

PATENT NO. : 6,467,633 B2
DATED : October 22, 2002
INVENTOR(S) : Mendoza et al.

It is certified that error appears in the above-identified patent and that said Letters Patent is hereby corrected as shown below:

<u>Column 9,</u>
Line 22, "comer" should read -- corner --

<u>Column 10,</u>
Line 34, "comer" should read -- corner --

Signed and Sealed this

Eighteenth Day of March, 2003

JAMES E. ROGAN
*Director of the United States Patent and Trademark Office*